United States Patent
Shen et al.

(10) Patent No.: US 9,749,452 B2
(45) Date of Patent: Aug. 29, 2017

(54) CONTACT PERSON DISPLAY PROCESSING METHOD AND MOBILE TERMINAL

(71) Applicant: ZTE CORPORATION, Shenzhen, Guangdong Province (CN)

(72) Inventors: Longqing Shen, Shenzhen (CN); Peng Li, Shenzhen (CN); Yanfang Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 341 days.

(21) Appl. No.: 14/399,558

(22) PCT Filed: Dec. 27, 2012

(86) PCT No.: PCT/CN2012/087727
§ 371 (c)(1),
(2) Date: Dec. 1, 2014

(87) PCT Pub. No.: WO2013/166849
PCT Pub. Date: Nov. 14, 2013

(65) Prior Publication Data
US 2015/0156302 A1   Jun. 4, 2015

(30) Foreign Application Priority Data

May 7, 2012 (CN) .......................... 2012 1 0140717

(51) Int. Cl.
- *G06F 17/30* (2006.01)
- *H04M 1/725* (2006.01)
- *G06Q 10/10* (2012.01)

(52) U.S. Cl.
CPC .. *H04M 1/72519* (2013.01); *G06F 17/30867* (2013.01); *G06Q 10/107* (2013.01)

(58) Field of Classification Search
USPC .................................................. 707/705, 723
See application file for complete search history.

(56) References Cited

U.S. PATENT DOCUMENTS

2008/0263457 A1* 10/2008 Kim ................ H04M 1/274583
715/753
2009/0083299 A1* 3/2009 Chen .................... G06Q 10/107
(Continued)

FOREIGN PATENT DOCUMENTS

CN 101588400 A 9/2009
CN 102006365 A 6/2011
(Continued)

*Primary Examiner* — Kim Nguyen
(74) *Attorney, Agent, or Firm* — Ling Wu; Stephen Yang; Ling and Yang Intellectual Property

(57) ABSTRACT

The present document provides a method for processing contact person display and mobile terminal. The method includes: a mobile terminal setting a calculation formula for contact weights of contact persons according to communication information parameters, and configuring a plurality of contact weight ranges and corresponding display modes thereof; the mobile terminal storing the communication information of each contact person; reading the communication information at regular intervals, and calculating the contact weight of each contact person according to the calculation formula; and looking for a display mode corresponding to the contact weight range to which the calculated contact weight belongs, and displaying the corresponding contact person according to the corresponding display mode.

12 Claims, 1 Drawing Sheet

(56) References Cited

U.S. PATENT DOCUMENTS

| | | | |
|---|---|---|---|
| 2010/0058196 A1 | 3/2010 | Krishnan et al. | |
| 2012/0157157 A1* | 6/2012 | Chakra | H04M 1/7253 455/550.1 |
| 2013/0017791 A1* | 1/2013 | Wang | H04W 16/14 455/41.2 |
| 2013/0023215 A1* | 1/2013 | Wang | H04W 16/14 455/41.2 |
| 2013/0290095 A1* | 10/2013 | Crinon | G06Q 30/0246 705/14.45 |
| 2013/0337813 A1* | 12/2013 | Van Phan | H04W 36/08 455/436 |
| 2014/0039828 A1* | 2/2014 | Kasama | H04M 1/185 702/141 |
| 2014/0095293 A1* | 4/2014 | Abhyanker | H04L 67/18 705/14.41 |
| 2014/0098834 A1* | 4/2014 | Rohr | G01N 31/229 374/102 |

FOREIGN PATENT DOCUMENTS

| | | |
|---|---|---|
| CN | 102158581 A | 8/2011 |
| CN | 102439955 A | 5/2012 |
| EP | 2216703 A2 | 8/2010 |
| EP | 2336957 A1 | 6/2011 |
| WO | 2011006752 A1 | 1/2011 |

\* cited by examiner

CONTACT PERSON DISPLAY PROCESSING METHOD AND MOBILE TERMINAL

TECHNICAL FIELD

The present document relates to a method for processing contact person display and mobile terminal.

BACKGROUND OF THE RELATED ART

Most mobile terminals, fixed terminals and instant communication systems can let the user set up an address book, and the screens of these terminals can display the information of contact person, so that the user searches for, checks and initiates the contact to the contact person.

Various terminal products have already got extensive popularization, and the social range of people is bigger and bigger with the development and progress of the society at the same time, and it has been already very common to store three to five hundred and even thousands of contact persons in the address book at the same time. At present, the existing address book of terminal records the personal essential information, such as, the user name, the telephone number, the E-mail address, the company or organization, etc., and arranges it on the contact person list in a sequence of the phonetic alphabet, stroke or American Standard Code for Information Interchange (ASCII) of the user name. The improved method is to arrange the contact person list through a certain sequence rule, for example, the contact person list is arranged automatically through the contact frequency; or the contact person list is arranged automatically through different cities which the mobile phones are located; or the contact person list is arranged through a conversation suitability degree.

In the modern society, the social activity and emotional network around individuals should be maintained by frequent communications, and the family relatives and friends need to be communicated at regular intervals, and the business network needs to be kept in the persistent connection. The above-mentioned sorting method of the address book is helpful in fast searching for the contact person with a high communication frequency or suitability degree, but for the contact person with less communication, its display position will move to the back segment of the address book constantly, which causes that the difficulty of searching for the person with less contact in the address book is higher, resulting in more negligent in contact, which is not conducive to the maintenance of the social relation network.

SUMMARY OF THE INVENTION

The technical problem that the present document requires to solve is to provide a method for processing contact person display and mobile terminal, to remind the contact frequency of each contact person.

In order to solve the above-mentioned technical problem, the present document adopts the following technical scheme.

A method for processing contact person display comprises:

a mobile terminal setting a calculation formula for contact weights of contact persons according to communication information parameters, and configuring a plurality of contact weight ranges and corresponding display modes thereof;

the mobile terminal storing communication information of each contact person;

the mobile terminal reading the communication information at regular intervals, and calculating the contact weight of each contact person according to the calculation formula;

the mobile terminal looking for a display mode corresponding to a contact weight range to which the calculated contact weight belongs, and displaying a corresponding contact person according to the corresponding display mode.

Alternatively, the communication information parameters comprise one or more of following coefficients:

a call duration related coefficient, an outgoing call related coefficient, an incoming call related coefficient, a sending short message related coefficient, a receiving short message related coefficient, a sending mail related coefficient, a receiving mail related coefficient and a correspondence coefficient between communication time and a current time interval.

Alternatively, the calculation formula is:

$$X=\Sigma A \cdot K_T K_A + \Sigma \overline{A} \cdot K_T \cdot K_A + \Sigma B \cdot K_A + \Sigma \overline{B} \cdot K_A + \Sigma C \cdot K_A + \Sigma \overline{C} \cdot K_A$$

wherein, X is the contact weight of the contact person, $K_A$ is the correspondence coefficient between the communication time and the current time interval, $K_T$ is the call duration related coefficient, A is the outgoing call related coefficient, $\overline{A}$ is the incoming call related coefficient, B is the sending short message related coefficient, $\overline{B}$ is the receiving short message related coefficient, C is the sending mail related coefficient, and $\overline{C}$ is the receiving mail related coefficient.

Alternatively, the display mode comprises one or more of following display modes:

color, picture, characters and animation.

Alternatively, the step of the mobile terminal looking for a display mode corresponding to a contact weight range to which the calculated contact weight belongs, and displaying a corresponding contact person according to the corresponding display mode comprises:

when the mobile terminal receives an incoming call, inquiring a corresponding contact person according to the number of the incoming call;

obtaining a calculated contact weight according to the found contact person; and looking for the display mode corresponding to the contact weight range to which the contact weight belongs according to the contact weight, and displaying the contact person according to the corresponding display mode on an incoming call interface.

A mobile terminal comprises a configuration module, a storage module, a calculation module and a display module, wherein:

the configuration module is configured to set a calculation formula for contact weights of contact persons according to communication information parameters, and configure a plurality of contact weight ranges and corresponding display modes thereof;

the storage module is configured to store communication information of each contact person;

the calculation module is configured to read the communication information at regular intervals, and calculate the contact weight of each contact person according to the calculation formula; and the display module is configured to look for a display mode corresponding to a contact weight range to which the calculated contact weight belongs, and display a corresponding contact person according to the corresponding display mode.

Alternatively, the communication information parameters comprise one or more of following coefficients:

a call duration related coefficient, an outgoing call related coefficient, an incoming call related coefficient, a sending short message related coefficient, a receiving short message related coefficient, a sending mail related coefficient, a receiving mail related coefficient and a correspondence coefficient between communication time and a current time interval.

Alternatively, the calculation formula is:

$$X = \Sigma A \cdot K_T \cdot K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

wherein, X is the contact weight of the contact person, $K_\Delta$ is the correspondence coefficient between the communication time and the current time interval, $K_T$ is the call duration related coefficient, A is the outgoing call related coefficient, $\overline{A}$ is the incoming call related coefficient, B is the sending short message related coefficient, $\overline{B}$ is the receiving short message related coefficient, C is the sending mail related coefficient, and $\overline{C}$ is the receiving mail related coefficient.

Alternatively, the display mode comprises one or more of following display modes:

color, picture, characters and animation.

Alternatively, the mobile terminal further comprises an incoming call module, wherein:

the incoming call module is configured to: when receiving an incoming call, inquire a corresponding contact person according to the number of the incoming call, and obtain a calculated contact weight according to the found contact person;

the display module is further configured to look for a display mode corresponding to the contact weight range to which the obtained contact weight belongs according to the contact weight obtained by the incoming call module, and display the contact person according to the corresponding display mode on an incoming call interface.

The above-mentioned technical scheme provides a method for processing contact person display and mobile terminal, providing a new display reminding method, helping the user visually check the contact frequency of each contact person in the address book, which can distinguish the closeness degree of the contact persons through different visual displays when checking the conversation record and the short message and can remind the user in time when there is an incoming call, providing help for the user to maintain the daily social network, thus improving the user experience effect of the terminal products.

PREFERRED EMODIMENTS OF THE PRESENT DOCUMENT

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other at random.

The core idea of the embodiment of the present document is: collecting the recent communication record of the contact person of the terminal, including conversation, short message, E-mail, etc., performing analyzing and screening by a judging rule, and calculating and obtaining the weight of every contact person by a simple formula; setting a certain threshold range, using different reminders (which can be color, pattern or animation, etc.) within every threshold range to display the contact person respectively, and reminding the terminal user visually.

Figure 1:
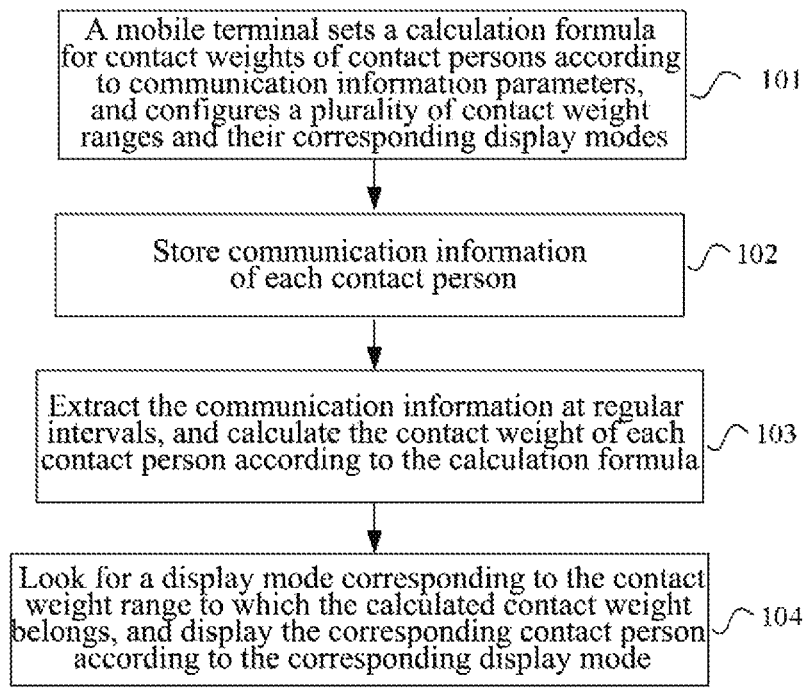
FIG. 1 is a flow chart of a method for processing contact person display according to an embodiment of the present document.

The method for processing contact person display of the embodiment of the present document, as shown in FIG. 1, includes the following steps.

In step 101, a mobile terminal sets a calculation formula for contact weights of contact persons according to communication information parameters, and configures a plurality of contact weight ranges and their corresponding display modes.

The communication information parameters include one or more of the following coefficients:

a call duration related coefficient, an outgoing call related coefficient, an incoming call related coefficient, a sending short message related coefficient, a receiving short message related coefficient, a sending mail related coefficient, a receiving mail related coefficient and a correspondence coefficient between communication time and a current time interval.

The present embodiment set a weight calculation formula, for example, as follows:

$$X = \Sigma A \cdot K_T \cdot K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

wherein, X is the contact weight of the contact person, $K_\Delta$ represents the correspondence coefficient between the communication time and the current time interval, $K_T$ represents the call duration related coefficient, A represents the outgoing call related coefficient, $\overline{A}$ represents the incoming call related coefficient, B represents the sending short message related coefficient, $\overline{B}$ represents the receiving short message related coefficient, C represents the sending mail related coefficient, and $\overline{C}$ represents the receiving mail related coefficient.

In the configuration option, a time interval of statistical analysis, a threshold range and corresponding display mode (for example, the color or the pattern, the animation or the characters reminder), a frequency of state update (update after every communication or by day, by week, by month) and update time are set, and recorded in the configuration file; the set threshold range and the display configuration in the corresponding range can be read from the configuration file, the initialization processing is performed according to the set parameter, to initialize the color, the picture or the animation loading information.

In step 102, the mobile terminal stores communication information of each contact person.

The mobile terminal stores the communication record of the contact person (for example, including: the name of the contact person, conversation time, the time of sending the short message and the time of sending the E-mail, etc.) according to a certain format, writes the communication record into the communication record file, writes the named file into the storage, and adds the newest communication record into the communication record file whenever there is a communication action (including the conversation, the short message and the E-mail, etc.).

In step 103, the mobile terminal extracts the communication information at regular intervals, and calculates the contact weight of each contact person according to the calculation formula.

The mobile terminal reads the communication record from the communication record file, extracts the name of the contact person, the communication type (for example: the telephone, the short message and the E-mail, etc.), the communication time (calling, called, sending short messages, receiving short messages, sending E-mails, receiving E-mails, etc.) and the conversation duration of each communication from the communication record.

The mobile terminal reads the set calculation parameter from the configuration file, traverses the record read from the communication record file according to the weight calculation formula set in the first step, and calculates the weight by contact person.

In step 104, the mobile terminal looks for a display mode corresponding to the contact weight range to which the calculated contact weight belongs, and displays the corresponding contact person according to the corresponding display mode.

For example, it can be displayed in the address book, the conversation record and the short message checking interface and also can be displayed in the incoming call interface and the outgoing call interface, and also can be displayed for different services for the contact person, for example, when receiving the mail, the dialog box pops up for displaying, etc.

In the method described by the embodiment of the present document, through storing the history record information of communication of the terminal user, the stored record information is read, and the weight of the terminal user and every contact person is calculated according to the set parameter and method, and various contact persons are displayed by different colors, patterns or animations within the set threshold range according to different thresholds, so that the users are able to visually know the closeness degree of the contact persons when opening the address book, the short message or the conversation record interface, and the users are reminded about the closeness relation of the contact persons of the incoming call through displaying when there is an incoming call; the above-mentioned actions can be triggered according to a certain frequency and time, providing effective help for the user to maintain the social network, thus further developing the function of the terminal in the social communication and promoting the user experience of the terminal products.

The execution steps of calculating the contact weight of the contact person, and visually displaying the address book, the conversation record and the short message checking interface, and the reminding method of the incoming call display provided by the embodiment of the present document are further illustrated in detail by combining the accompanying drawings hereinafter.

In step 201: various parameter values in the weight calculation formula are set.

$$X = \Sigma A \cdot K_T \cdot K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

Wherein, A=0.8, $\overline{A}$=1, B=0.4, $\overline{B}$=0.5, C=0.1, $\overline{C}$=0.12.

$K_T$ is in term of minute and will be calculated as one minute if less than one minute.

$K_\Delta$ a is a correspondence coefficient value between the communication time and the current time interval, referring to Table 1:

TABLE 1

| Time interval | Parameter value $K_\Delta$ |
| --- | --- |
| Within one day | 5 |
| Two to three days | 4 |
| Three days to one week | 3 |
| One week to one month | 2 |
| One month to three months | 1 |
| Three months to six months | 0.5 |
| Six months to one year | 0.2 |
| More than one year | 0 |

Every above-mentioned parameter value can be set according to the demand.

In step 202: in the configuration option, it sets the time interval of the statistical analysis as the time interval of the recent six months and sets the threshold range as: 0~10, 10~30, 30~50, 50~100, more than 100, and it displays with different colors in different threshold ranges; the smaller the value is, the lighter the color is; for example, referring to Table 2. The display effect can be set at random as well.

TABLE 2

| Weight range | Display color |
| --- | --- |
| 0~10 | Light gray |
| 10~30 | Gray |
| 30~50 | Black |
| 50~100 | Light blue |
| >100 | Purple |

In step 203: in the configuration option, it sets the frequency of state update as updating after every communication action is completed.

In step 204: the communication information is recorded, and the present embodiment records the communication information according to the Extensible Markup Language (XML) format each time, and the design format is as follows:

```
<CommunicationRecord>
    <ContactName></ ContactName >
    <Type></Type>
    <Date></Date>
    <Duration></Duration>
</ CommunicationRecord >
```

Wherein: the ContactName field represents the name of the contact person; the Type field represents the communication type, including incoming call, outgoing call, sending short message, receiving short message, sending mail, receiving mail and so on; the Date field represents the communication time and it is stored according to the format of "year-month-day"; and the Duration field represents the communication duration, and this field is effective when the communication type is the incoming call and the outgoing call, taking minute as the unit.

It triggers the control action to start and calls the communication record management module to start working, and adds the communication record into the communication record file after each communication action is completed. When the space occupied by the communication record file exceeds a certain size (it is set as 64 Kbyte in the present embodiment), it creates a file again to write the newest communication record. In order to be convenient for management, it creates one communication record management file to store the information of every communication record file, including the name of the communication record file and the creation time of the file.

In step 205: the configuration information is read, including: (1) the time range of the statistical analysis, which is set as the recent half year in the present embodiment; (2) the threshold range and the color configuration, referring to the corresponding parameter in the table in step 202.

In step 206: the communication record management file is opened, the communication record file and the corresponding creation time of file are read, and one link table is created; wherein, each node of link table stores the name of the communication record file and the creation time of file, recording the obtained information in the link table, and the nodes of link table are then circularly processed and the node of which the creation time of file exceeds half a year is removed.

In step 207: according to the link table in step 206, the communication record file stored in each node is opened, and the communication record data are read and recorded in the linear list or array. Then according to the formula in step 201, the contact weight is calculated according to the contact person.

In step 208: according to the corresponding table of the display configuration and the threshold range in step 202, the visual display module is called to update the color display effect of the short message and conversation record interface.

In step 209: when there is an incoming call, the number of the incoming call is obtained, the contact person corresponding to the number of the incoming call is inquired, and then the contact weight calculated in step 207 is obtained, and the visual display module is called to update the color display effect of the contact person in the incoming call interface.

In step 210: the update frequency set in step 203 is obtained, which is updating after each communication is completed in the present embodiment, and the timing trigger is set and activated; and when the trigger condition happens, the actions of the above-mentioned step 204 to step 209 are executed repeatedly.

Figure 2:
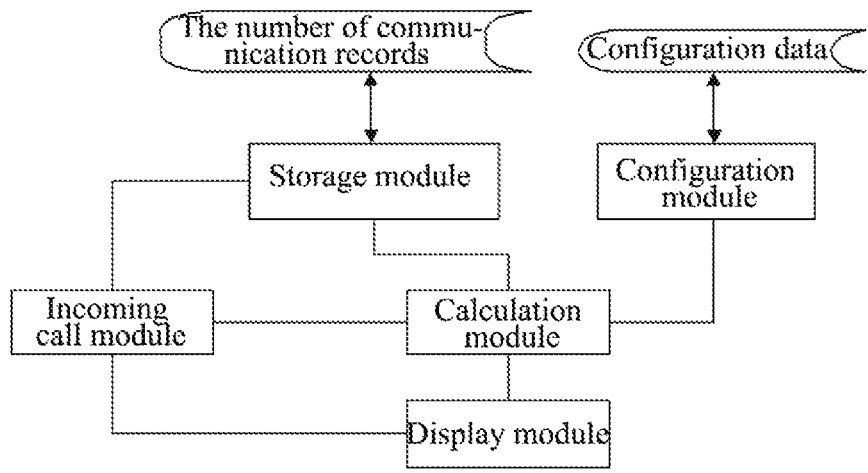
FIG. 2 is a diagram of a mobile terminal according to an embodiment of the present document.

FIG. 2 is a diagram of a mobile terminal according to an embodiment of the present document. As shown in FIG. 2, the mobile terminal of the present embodiment includes a configuration module, a storage module, a calculation module and a display module, wherein:

the configuration module is configured to set a calculation formula for contact weights of contact persons according to communication information parameters, and configure a plurality of contact weight ranges and corresponding display modes thereof;

the storage module is configured to store communication information of each contact person;

the calculation module is configured to read the communication information at regular intervals, and calculate the contact weight of each contact person according to the calculation formula; and the display module is configured to look for a display mode corresponding to the contact weight range to which the calculated contact weight belongs, and display the corresponding contact person according to the corresponding display mode.

Wherein, the communication information parameters comprise one or more of the following coefficients:

a call duration related coefficient, an outgoing call related coefficient, an incoming call related coefficient, a sending short message related coefficient, a receiving short message related coefficient, a sending mail related coefficient, a receiving mail related coefficient and a correspondence coefficient between communication time and a current time interval.

Alternatively, the calculation formula is:

$$X = \Sigma A \cdot K_T \cdot K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

wherein, X is the contact weight of the contact person, $K_\Delta$ the correspondence coefficient between the communication time and the current time interval, $K_T$ is the call duration related coefficient, A is the outgoing call related coefficient, $\overline{A}$ is the incoming call related coefficient, B is the sending short message related coefficient, $\overline{B}$ is the receiving short message related coefficient, C is the sending mail related coefficient, and $\overline{C}$ is the receiving mail related coefficient.

Wherein, the mobile terminal further comprises an incoming call module, wherein:

the incoming call module is configured to: when receiving an incoming call, inquire a corresponding contact person according to the number of the incoming call, and obtain the calculated contact weight according to the found contact person;

the display module is further configured to look for the display mode corresponding to the contact weight range to which the obtained contact weight belongs according to the contact weight obtained by the incoming call module, and display the contact person according to the corresponding display mode on an incoming call interface.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

The above description is only the preferred embodiments of the present document. Certainly, the present document can have a variety of other embodiments. Those skilled in the art can make the corresponding modifications and variations according to the present document without departing from the spirit and essence of the present document. And all of these modifications or the variations should be included in the protection scope of the appended claims of the present document.

INDUSTRIAL APPLICABILITY

The above-mentioned technical scheme provides a method for processing contact person display and mobile terminal, providing a new display reminding method, helping the user visually check the contact frequency of each contact person in the address book, which can distinguish the closeness degree of the contact persons through different visual displays when checking the conversation record and the short message and can remind the user in time when there is an incoming call, providing help for the user to maintain the daily social network, thus improving the user experience effect of the terminal products. Therefore, the present document has very strong industrial applicability.

What we claim is:

1. A method for processing contact person display, comprising:
   a mobile terminal setting a calculation formula for contact weights of contact persons according to communication information parameters, and configuring a plurality of contact weight ranges and corresponding display modes thereof;
   the mobile terminal storing communication information of each contact person;
   the mobile terminal reading the communication information at regular intervals, and calculating the contact weight of each contact person according to the calculation formula;
   the mobile terminal looking for a display mode corresponding to a contact weight range to which the calculated contact weight belongs, and displaying a corresponding contact person according to the corresponding display mode;
   wherein the calculation formula is:

$$X = \Sigma A \cdot K_T K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

wherein, X is the contact weight of the contact person, $K_\Delta$ is a correspondence coefficient between communication time and a current time interval, $K_T$ is a call duration related coefficient, A is an outgoing call related coefficient, $\overline{A}$ is an incoming call related coefficient, B is a sending short message related coefficient, $\overline{B}$ is a receiving short message related coefficient, C is a sending mail related coefficient, and $\overline{C}$ is a receiving mail related coefficient.

2. The method according to claim 1, wherein, the communication information parameters comprise following coefficients:
   the call duration related coefficient, the outgoing call related coefficient, the incoming call related coefficient, the sending short message related coefficient, the receiving short message related coefficient, the sending mail related coefficient, the receiving mail related coefficient and the correspondence coefficient between the communication time and the current time interval.

3. The method according to claim 2, wherein: the step of the mobile terminal looking for a display mode corresponding to a contact weight range to which the calculated contact weight belongs, and displaying a corresponding contact person according to the corresponding display mode comprises:
   when the mobile terminal receives an incoming call, inquiring a corresponding contact person according to the number of the incoming call;
   obtaining a calculated contact weight according to the found contact person; and
   looking for a display mode corresponding to a contact weight range to which the contact weight belongs according to the contact weight, and displaying the contact person according to the corresponding display mode on an incoming call interface.

4. The method according to claim 1, wherein: the display mode comprises one or more of following display modes: colors, pictures, characters and animations.

5. The method according to claim 4, wherein: the step of the mobile terminal looking for a display mode corresponding to a contact weight range to which the calculated contact weight belongs, and displaying a corresponding contact person according to the corresponding display mode comprises:
   when the mobile terminal receives an incoming call, inquiring a corresponding contact person according to the number of the incoming call;
   obtaining a calculated contact weight according to the found contact person; and
   looking for a display mode corresponding to a contact weight range to which the contact weight belongs according to the contact weight, and displaying the contact person according to the corresponding display mode on an incoming call interface.

6. The method according to claim 1, wherein: the step of the mobile terminal looking for a display mode corresponding to a contact weight range to which the calculated contact weight belongs, and displaying a corresponding contact person according to the corresponding display mode comprises:
   when the mobile terminal receives an incoming call, inquiring a corresponding contact person according to the number of the incoming call;
   obtaining a calculated contact weight according to the found contact person; and
   looking for a display mode corresponding to a contact weight range to which the contact weight belongs according to the contact weight, and displaying the contact person according to the corresponding display mode on an incoming call interface.

7. A mobile terminal, comprising
   a processor, and
   a non-transitory computer readable medium storing programs that, when executed by the processor, cause the processor to:
   set a calculation formula for contact weights of contact persons according to communication information parameters, and configure a plurality of contact weight ranges and corresponding display modes thereof;
   store communication information of each contact person;
   read the communication information at regular intervals, and calculate the contact weight of each contact person according to the calculation formula;
   look for a display mode corresponding to a contact weight range to which the calculated contact weight belongs, and display a corresponding contact person according to the corresponding display mode;
   wherein the calculation formula is:

$$X = \Sigma A \cdot K_T K_\Delta + \Sigma \overline{A} \cdot K_T \cdot K_\Delta + \Sigma B \cdot K_\Delta + \Sigma \overline{B} \cdot K_\Delta + \Sigma C \cdot K_\Delta + \Sigma \overline{C} \cdot K_\Delta$$

wherein, X is the contact weight of the contact person, $K_\Delta$ is a correspondence coefficient between communication time and a current time interval, $K_T$ is a call duration related coefficient, A is an outgoing call related coefficient, $\overline{A}$ is an incoming call related coefficient, B is a sending short message related coefficient, $\overline{B}$ is a receiving short message related coefficient, C is a sending mail related coefficient, and $\overline{C}$ is a receiving mail related coefficient.

8. The mobile terminal according to claim 7, wherein, the communication information parameters comprise following coefficients:
   the call duration related coefficient, the outgoing call related coefficient, the incoming call related coefficient, the sending short message related coefficient, the receiving short message related coefficient, the sending mail related coefficient, the receiving mail related coefficient and the correspondence coefficient between the communication time and the current time interval.

9. The mobile terminal according to claim 8, wherein the programs further cause the processor to:
   when receiving an incoming call, inquire a corresponding contact person according to the number of the incoming call, and obtain a calculated contact weight according to the found contact person.

10. The mobile terminal according to claim 7, wherein: the display mode comprises one or more of following display modes:
   colors, pictures, characters and animations.

11. The mobile terminal according to claim 10, wherein the programs further cause the processor to:
   when receiving an incoming call, inquire a corresponding contact person according to the number of the incoming call, and obtain a calculated contact weight according to the found contact person.

12. The mobile terminal according to claim 7, wherein the programs further cause the processor to:
   when receiving an incoming call, inquire a corresponding contact person according to the number of the incoming call, and obtain a calculated contact weight according to the found contact person.

\* \* \* \* \*